United States Patent [19]

Merritt

[11] Patent Number: 4,759,174

[45] Date of Patent: Jul. 26, 1988

[54] VEGETABLE HARVESTING APPARATUS

[76] Inventor: Oswell F. Merritt, P.O. Box 55, Many, La. 71449

[21] Appl. No.: 71,864

[22] Filed: Jul. 10, 1987

[51] Int. Cl.⁴ ............................................. A01D 45/00
[52] U.S. Cl. ................................. 56/327.2; 56/327.1; 56/338; 30/280
[58] Field of Search .................... 56/327.1, 327.2, 331, 56/335, 338; 30/278, 280

[56] References Cited

U.S. PATENT DOCUMENTS

| | | | |
|---|---|---|---|
| 887,466 | 5/1908 | Davis | 56/327.2 |
| 2,188,768 | 1/1940 | Demory | 56/327.2 |
| 3,546,865 | 12/1970 | Woodward | 56/327.2 |
| 4,191,008 | 3/1980 | Smith | 56/338 X |

Primary Examiner—Stephen F. Husar
Attorney, Agent, or Firm—John M. Harrison

[57] ABSTRACT

A vegetable harvesting apparatus which is characterized by a generally triangular-shaped hopper having a cutting opening provided therein, a blade slidably mounted in the hopper and a handle attached to the opposite end of the hopper from the cutting opening, with a pivoting lever mounted in the handle and a blade rod connecting the upper end of the pivoting lever to the blade. The vegetable harvesting apparatus is utilized by extending a vegetable such as a pod of okra through the opening in the front portion of the hopper and forcing the blade against the pod stem by manipulating the rod lever with the hand, to sever the stem and collect the okra pod in the hopper.

20 Claims, 1 Drawing Sheet

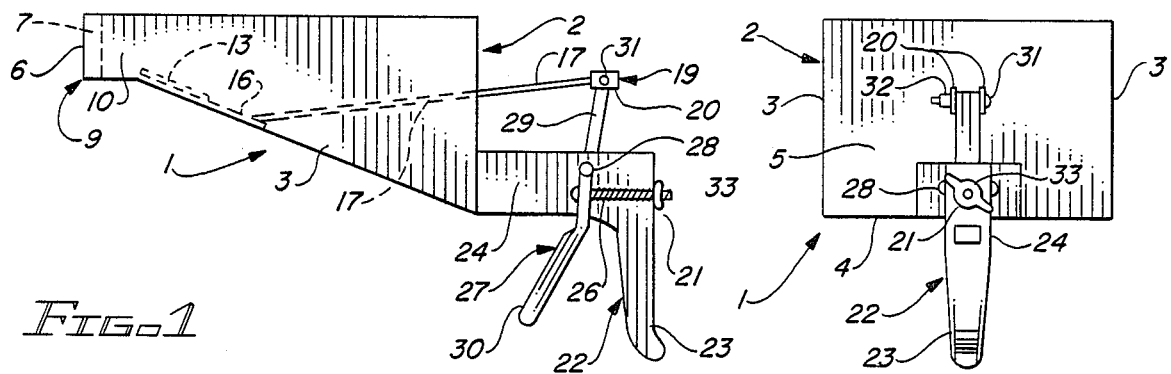
Fig.-1
Fig.-3
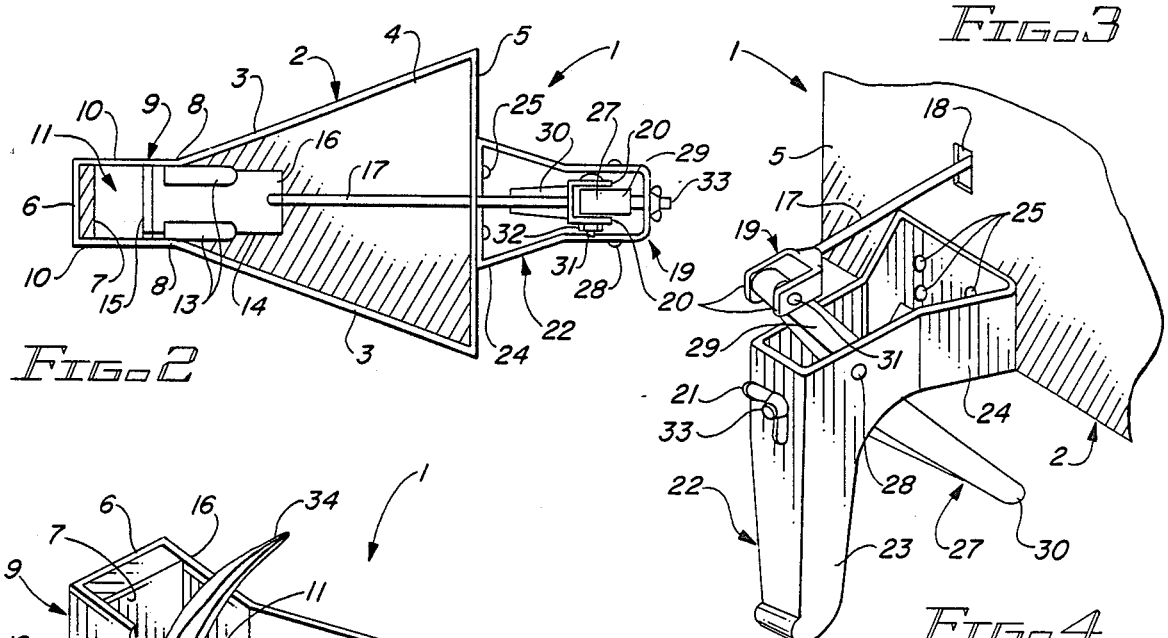
Fig.-2
Fig.-4
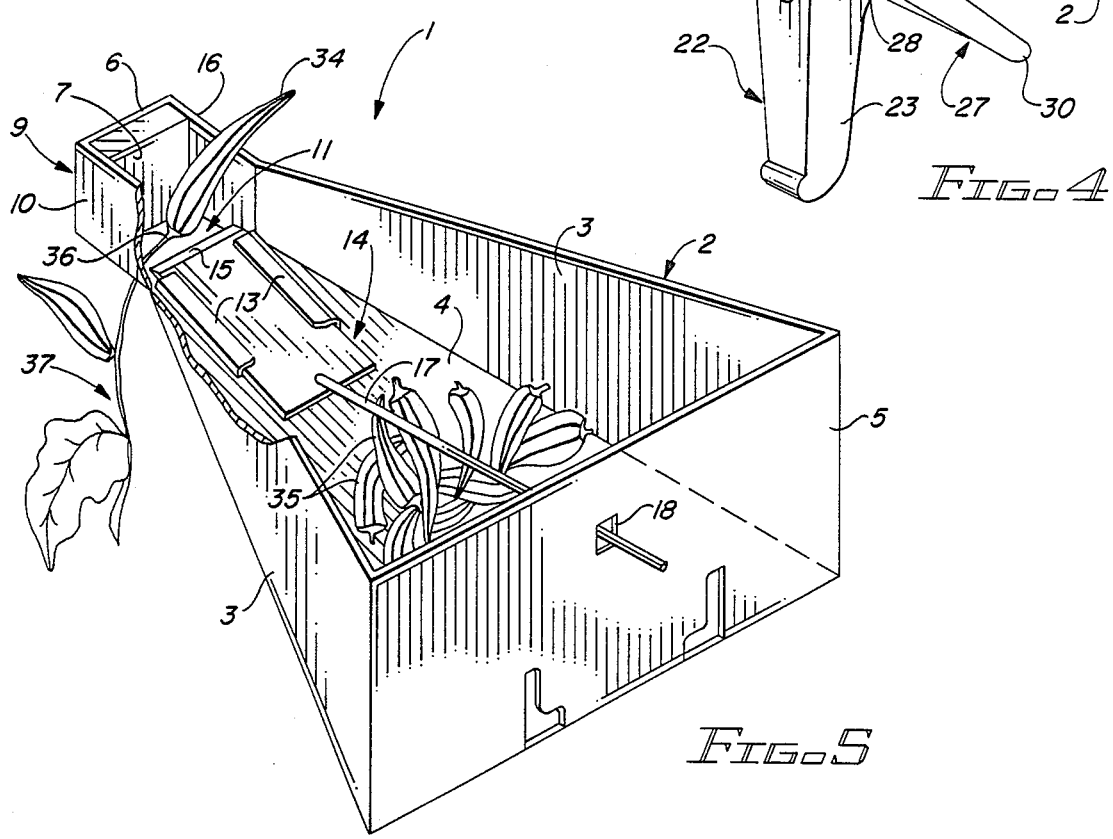
Fig.-5

VEGETABLE HARVESTING APPARATUS

BACKGROUND OF THE INVENTION

1. Field of the Invention

This invention relates to a harvesting apparatus and more particularly, to a vegetable harvesting apparatus which is characterized by a triangular-shaped hopper, an opening provided in the front end of the hopper and a blade slidably mounted in the hopper and having a cutting edge facing the opening, with a handle secured to the hopper opposite the opening and a lever mechanism connected to the blade for severing the stems of vegetables such as spears of asparagus and pods of okra which are extended through the opening in the hopper and collecting the spears of asparagus or okra pods in the hopper.

One of the problems realized in collecting vegetables such as okra, is the irritation which okra leaves, stems and pods cause to the skin upon contact. Furthermore, it is difficult and cumbersome to wear gloves when collecting okra, because the okra pods normally must be severed from the stem with a knife or other sharp instrument, thus making the collecting operation difficult. Furthermore, after severing the okra pod or other vegetable from the stem, it must be collected in a basket, sack or other container which must be carried by or strapped to the user during the harvesting operation.

2. Description of the Prior Art

The harvesting and collection of vegetables such as asparagus spears and okra pods is normally accomplished by severing each spear or pod individually and placing the spear or pod in a basket, sack or pouch which is either carried by or strapped to the user. U.S. Pat. No. 2,188,768, dated Jan. 30, 1940, to H. Demory, discloses a "Harvesting Device". The harvesting device detailed in this patent is characterized by a barrel-shaped harvesting receptacle for receiving and severing various crop elements such as asparagus, and a collecting receptacle secured to the harvesting receptacle, with means for transferring the severed crop element from the harvesting receptacle to the collecting receptacle, wherein the entire harvesting device is carried by the user for harvesting the crop elements. U.S. Pat. No. 3,546,865, dated Dec. 15, 1970, to W. H. Woodward, discloses an "Asparagus Harvester". The asparagus harvester detailed in this patent is characterized by a cylindrically-shaped barrel having a handle approximately midway of the ends thereof, with a cutting mechanism provided at one end and a collecting bucket or basket provided at the opposite end. A conveying system delivers the severed asparagus heads or spears through the cylindrical collector and deposits the asparagus spears into the bucket. U.S. Pat. No. 4,191,008, dated Mar. 4, 1980, to Archie O. Smith, discloses an "Apparatus For Harvesting Okra or the Like". The apparatus includes an elongated frame having a handle at one end and a cutter member mounted on the opposite end. In order to prevent any contact between the user and the irritating pods of okra, a trigger is provided at the handle for remotely operating the cutter and a shroud partially surrounds the handle to protect the hand of the user during cutting. In one embodiment, the cutter includes a razor blade located beneath a cylindrical guide member that retains the okra pod in position for cutting the stem, while a pair of stabilizing ears steady the guide member on a branch of the okra plant. In a second embodiment, a rectangular guide member contains a stem-holding bracket that maintains the stem of the okra pod in proper position for cutting by a blade. A set of prongs carried by the blade pierces the pod stem during the cutting stroke and the pod is automatically released during retraction, for disposal into a separate collection receptacle.

It is an object of this invention to provide a new and improved vegetable harvesting apparatus.

Another object of the invention is to provide vegetable harvesting and collecting apparatus which is characterized by a shallow hopper having an opening at one end and a handle attached to the opposite end, with a blade slidably mounted in the hopper near the opening, a rod lever pivotally attached to the handle and a rod connecting the rod lever and the blade, in order to facilitate severing the stem of a vegetable such as an okra pod when the okra pod is projected through the opening in the hopper, by manipulating the blade against the stem and collecting the pod in the hopper.

Still another object of the invention is to provide a new and improved asparagus and okra harvesting apparatus which includes a generally triangular-shaped collection hopper having an opening at one end, a blade slidably mounted in the hopper, with the blade edge adapted for traversing the opening, a handle located at the opposite end of the hopper, with a pivoting lever attached to the handle and a rod connecting the top portion of the pivoting lever to the blade, whereby the blade is forced against the stem of an okra pod or asparagus spear when the okra pod or asparagus spear is inserted through the opening, to sever the okra pod or the asparagus spear and collect the okra pod or asparagus spear in the hopper.

Yet another object of this invention is to provide a new and improved okra harvesting apparatus which is characterized by a collecting hopper provided with a sliding blade assembly and a cooperating handle and pivoting lever, whereby a vegatable such as okra can be harvested and collected in the hopper responsive to operation of the pivoting lever and the sliding blade, without the necessity of an okra pod, stem or leaf touching any part of the user's body.

SUMMARY OF THE INVENTION

These and other objects of the invention are provided in a new and improved vegetable harvesting apparatus which is designed to receive, sever and collect such vegetables as okra pods and asparagus spears in a collecting hopper by operation of a sliding blade located in the hopper. In a preferred embodiment, the sliding blade is attached to one end of a rod extending through the hopper, with the opposite end of the rod attached to a pivoting lever carried by a handle secured to the hopper and the blade is manipulated by squeezing the pivoting lever to sever and collect the okra pods and asparagus spears without the necessity of touching the okra pods or asparagus spears.

BRIEF DESCRIPTION OF THE DRAWING

The invention will be better understood by reference to the accompanying drawing, wherein:

FIG. 1 is a side view of a preferred embodiment of the vegetable harvesting apparatus of this invention;

FIG. 2 is a top view of the vegetable harvesting apparatus illustrated in FIG. 1;

FIG. 3 is a rear view of the vegetable harvesting apparatus illustrated in FIGS. 1 and 2;

FIG. 4 is a sectional view of a preferred handle and rod lever assembly used in the vegetable harvesting apparatus; and FIG. 5 is a perspective view, partially in section, of the vegetable harvesting apparatus illustrated in FIGS. 1-3.

DESCRIPTION OF THE PREFERRED EMBODIMENTS

Referring initially to FIGS. 1-3 of the drawings the vegetable harvesting apparatus of this invention is generally illustrated by reference numeral 1. The vegetable harvesting apparatus 1 is characterized by a generally triangular-shaped hopper 2, defined by a pair of hopper sides 3, which converge at one end at oppositely disposed, parallel side bends 8 to define parallel chamber sides 10. The chamber sides 10 are connected by a cutting end 6 and together with the cutting end 6, further define a cutting chamber 9. A collection end 5 terminates the opposite, diverging ends of the hopper sides 3 and a hopper bottom 4 closes the bottom of the hopper 2, leaving a cutting opening 11 provided in the cutting chamber 9, as illustrated in FIG. 2. In a preferred embodiment, a wood or plastic cutting block 7 is mounted to the cutting end 6 of the cutting chamber 9 in the cutting opening 11, in order to receive the blade edge 15 of a blade 14, which is slidably mounted in a blade guide 13, attached to the hopper bottom 4 of the hopper 2, as further illustrated in FIG. 2. The chamber sides 10 define parallel walls for the cutting chamber 9 and flare outwardly beyond the blade edge 15 of the blade 14, at the side bends 8, to define the hopper sides 3, respectively. A flat blade shank 16 defines the opposite end of the blade 14 from the blade edge 15 and fixedly receives one end of a blade rod 17, which blade rod 17 projects through a rod opening 18 in the collection end 5 of the hopper 2 and is welded or otherwise secured to a blade rod clevis 19. As illustrated in FIG. 4, the handle bracket 24 of a handle 22 is secured to the collection end 5 of the hopper 2 by means of multiple bracket fasteners 25 and a rod lever 27 is pivotally attached to the handle bracket 24 by means of a pivot pin 28. The lever head 29 of the rod lever 27 is pivotally secured to the clevis plates 20 of the blade rod clevis 19 by means of a clevis bolt 31 and a cooperating nut 32, as illustrated in FIGS. 2 and 3 of the drawing. The bottom segment of the rod lever 27 defines a lever pull 30, which is disposed opposite the handle grip 23 of the handle 22, for grasping by the fingers and pulling rearwardly in the direction of the arrow, as illustrated in FIG. 4, to cause the blade 14 to slide forwardly with the blade edge 15 seated against the cutting block 7, as hereinafter further described. A spring bolt 33 extends through the lever pull 30 of the rod lever 27 at a point below the pivot pin 28 and a coil spring 26 is wrapped around the spring bolt 33 between the handle grip 23 and the lever pull 30, as illustrated in FIG. 1. A wing nut 21 is threaded on the extending end of the spring bolt 33 on the outside surface of the handle grip 23 to adjust the tension in the coil spring 26 and the distance between the lever pull 30 and the handle grip 23, further as illustrated in FIGS. 1-4.

Referring now to FIGS. 4 and 5 of the drawing, when it is desired to harvest a vegetable such as a growing okra pod 34, supported on a pod stem 36 in an okra plant 37, the growing okra pod 34 is first extended through the cutting opening 11 in the cutting chamber 9, as illustrated in FIG. 5. The blade 14 is then forced forwardly in the blade guide 13 against the tension in the spring 26, by pulling the lever pull 30 rearwardly, as indicated by the arrow in FIG. 4. This action causes the blade edge 15 of the blade 14 to engage and cleanly sever the pod stem 36 of the growing okra pod 34 as the blade edge 15 contacts the cutting block 7, and allows the growing okra pod 34 to fall into the hopper 2 and join the collected severed okra pods 35, as illustrated in FIG. 5.

It will be appreciated by those skilled in the art that the vegetable harvesting apparatus of this invention is characterized by convenience and flexibility, in that a large number of severed okra pods 35, as well as asparagus spears and other vegetables, and certain fruits, (not illustrated), can be collected in the hopper 2. This harvesting is easily accomplished by manipulating the cutting chamber 9 over a growing okra pod 35 or other vegetable or fruit of selected size, as illustrated in FIG. 5 and subsequently forcing the lever pull 30 rearwardly in the direction of the arrow, as illustrated in FIG. 4. Such manipulation of the vegetable harvesting apparatus 1 to harvest a collection of severed okra pods 35, for example, can be deftly and efficiently accomplished until the hopper 2 is filled with severed okra pods 35, without having to touch either the growing okra pod 34, the severed okra pods 35 or the pod stem 36 of the okra plant 37. In addition to harvesting such vegetables as okra and asparagus, in non-exclusive particular, it will be appreciated that various fruits, such as cherries, figs and other fruits can also be harvested and collected using the vegetable harvesting apparatus of this invention.

It will further be appreciated that the okra harvesting apparatus 1 of this invention can be constructed of a light-weight metal such as aluminum or it can be built of such materials as fiberglass or injection-molded plastic materials which are well known to those skilled in the art.

Furthermore, the vegetable harvesting apparatus 1 can be utilized with one hand when the heel of the hand is used to engage the handle grip 22 and the fingers are closed around the lever pull 30, to alternately manipulate the lever pull 30 toward the handle grip 23 and allow the lever pull 30 to move away from the handle 23, responsive to the action of the coil spring 26. The vegetable harvesting apparatus 1 can be utilized for harvesting and collecting such vegetables as growing okra pods 34 of selected size, both individually and in clusters, and can be manipulated to selectively cut the growing okra pods 34 at the pod stems 36 immediately below the end of the growing okra pods 34, to eliminate the need to trim the severed okra pods 35 prior to cooking. Furthermore, multiple severed okra pods 35 can be collected in the hopper 2 without interfering with the operation of the blade 14 and the lever pull 30 and without the need for an external basket or alternative collector. Accordingly, a large number of severed okra pods 35 or other vegetable or fruit can be collected in the hopper 2 before the hopper 2 must be emptied into such a container.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A vegetable harvesting apparatus comprising hopper means adapted to contain a supply of harvested vegetable; an opening provided in said hopper means for receiving a vegetable and a stem supporting the vegetable; blade means slidably mounted in said hopper means adjacent said opening for selectively severing the stem; and trigger means carried by said hopper means, said trigger means also connected to said blade means, whereby said blade means is sequentially caused to traverse said opening and sever the stem supporting the vegetable and the vegetable is collected in said hopper means, responsive to manipulation of said trigger means.

2. The vegetable harvesting apparatus of claim 1 wherein said hopper means further comprises a generally triangular-shaped hopper and wherein said opening is located at one apex of said triangular-shaped hopper.

3. The vegetable harvesting apparatus of claim 1 wherein said blade means further comprises a blade guide fixedly carried by said hopper means and a rectangular blade slidably carried by said blade guide, with a blade edge provided on one end of said blade, said blade edge facing said opening.

4. The vegetable harvesting apparatus of claim 1 wherein:
   (a) said hopper means further comprises a generally triangular-shaped hopper and wherein said opening is located at one apex of said triangular-shaped hopper; and
   (b) said blade means further comprises a blade guide fixedly carried by said hopper means and a rectangular blade slidably carried by said blade guide, with a blade edge provided on one end of said blade, said blade edge facing said opening.

5. The vegetable harvesting apparatus of claim 1 wherein said trigger means further comprises a handle carried by said hopper means; a lever pivotally carried by said handle; and a rod having one end attached to said lever and the opposite end of said rod attached to said blade means, whereby said blade means reciprocates across said opening responsive to manipulation of said lever.

6. The vegetable harvesting apparatus of claim 1 wherein:
   (a) said hopper means further comprises a generally triangular-shaped hopper and wherein said opening is located at one apex of said triangular-shaped hopper;
   (b) said blade means further comprises a blade guide fixedly carried by said hopper means and a rectangular blade slidably carried by said blade guide, with a blade edge provided on one end of said blade, said blade edge facing said opening; and
   (c) said trigger means further comprises a handle carried by said hopper; a lever pivotally carried by said handle; and a rod having one end attached to said lever and the opposite end of said rod attached to said blade, whereby said blade reciprocates in said blade guide across said opening responsive to manipulation of said lever.

7. The vegetable harvesting apparatus of claim 5 further comprising bias means located between said handle and said lever for normally biasing said lever away from said handle and said blade means away from said opening.

8. The vegetable harvesting apparatus of claim 7 wherein:
   (a) said hopper means further comprises a generally triangular-shaped hopper and wherein said opening is located at one apex of said triangular-shaped hopper; and
   (b) said blade means further comprises a blade guide fixedly carried by said hopper and a generally rectangular blade slidably carried by said blade guide, with a blade edge provided on one end of said blade, said blade edge facing said opening.

9. The vegetable harvesting apparatus of claim 3 further comprising blade contact means provided in said opening opposite said blade edge for receiving said blade edge responsive to severing the stem.

10. The vegetable harvesting and collecting apparatus of claim 6 further comprising:
    (a) blade contact means provided in said opening opposite said blade edge for receiving said blade edge responsive to severing the stem; and
    (b) bias means located between said handle and said lever for normally biasing said lever away from said handle and said blade away from said opening.

11. The vegetable harvesting apparatus of claim 10 wherein said bias means further comprises a spring.

12. A vegetable harvesting apparatus comprising a generally triangular-shaped hopper having a bottom, sides upward-standing from said bottom and an opening provided in said bottom; a blade slidably carried by said bottom of said hopper adjacent said opening, said blade adapted to selectively traverse said opening; a handle attached to said hopper and an elongated rod lever pivotally carried by said handle; and a rod extending through said hopper, said rod having one end fixedly attached to said rod lever and the opposite end of said rod attached to said blade, whereby said blade is slidably transversely displaced over said opening to sever the stem supporting a vegetable when the vegetable and stem are projected through said opening, responsive to manipulation of said rod lever.

13. The vegetable harvesting apparatus of claim 12 further comprising a blade edge provided on said blade opposite said opening and blade contact means provided in said opening opposite said blade edge for receiving said blade edge responsive to severing the stem.

14. The vegetable harvesting apparatus of claim 12 further comprising bias means located between said handle and said lever for normally biasing said lever away from said handle and said blade away from said opening.

15. The vegetable harvesting apparatus of claim 12 further comprising:
    (a) a blade edge provided on said blade opposite said opening and blade contact means provided in said opening opposite said blade edge for receiving said blade edge responsive to severing the stem; and
    (b) bias means located between said handle and said lever for normally biasing said lever away from said handle and said blade away from said opening.

16. The vegetable harvesting apparatus of claim 15 wherein said bias means is a spring.

17. The vegetable harvesting apparatus of claim 12 further comprising blade contact means provided in said opening opposite said blade edge for receiving said blade edge responsive to severing the stem.

18. The vegetable harvesting and collecting apparatus of claim 12 further comprising:
    (a) a blade edge provided on said blade opposite said opening and blade contact means provided in said opening opposite said blade edge for receiving said blade edge responsive to severing the stem;

(b) a coil spring located between said handle and said lever for normally biasing said lever away from said handle and said blade away from said opening; and (c) a block provided in said opening opposite said blade edge for receiving said blade edge responsive to severing the stem.

19. A vegetable harvesting and collecting apparatus comprising a generally triangular-shaped hopper having a bottom and upward-standing sides bordering the perimeter of said bottom; an opening provided in said bottom at the junction of two of said sides; a blade guide fixedly attached to said bottom and a rectangular blade slidably mounted in said blade guide, said blade characterized by a blade edge facing said opening; a handle attached to the one of said sides which lies opposite said opening, a lever pivotally carried by said handle and a blade rod slidably extending through said one of said sides, with one end of said blade rod attached to said lever and the opposite end of said blade rod attached to said blade, whereby manipulation of said lever forces said blade across said opening to sever the stem of a vegetable projected through said opening and collect the vegetable in the hopper.

20. The vegetable harvesting apparatus of claim 19 further comprising a spring located between said handle and said lever for normally biasing said lever away from said handle and said blade means away from said opening and a substantially resilient block provided in said opening opposite said blade edge for receiving said blade edge responsive to severing the stem.

* * * * *